United States Patent [19]

Kluzner

[11] Patent Number: 5,763,769
[45] Date of Patent: Jun. 9, 1998

[54] FIBER OPTIC MISFIRE, KNOCK AND LPP DETECTOR FOR INTERNAL COMBUSTION ENGINES

[76] Inventor: Michael Kluzner, 14450 Vernon, Oak Park, Mich. 48237

[21] Appl. No.: 543,324

[22] Filed: Oct. 16, 1995

[51] Int. Cl.⁶ ............................................. G01M 15/00
[52] U.S. Cl. .................... 73/115; 73/705; 73/715; 73/714; 73/756
[58] Field of Search ................ 73/705, 715, 714, 73/756, 727, 115, 116, 117.2, 117.3, 118.1, 35.01

[56] References Cited

U.S. PATENT DOCUMENTS

| | | | |
|---|---|---|---|
| 4,413,509 | 11/1983 | Moser et al. | 73/117.3 |
| 4,521,683 | 6/1985 | Miller | 73/715 |
| 4,760,733 | 8/1988 | Tanaka | 73/115 |
| 4,986,671 | 1/1991 | Sun et al. | 73/705 |
| 5,275,053 | 1/1994 | Wlodarczyk et al. | 73/705 |
| 5,351,528 | 10/1994 | Fukui et al. | 73/115 |
| 5,386,723 | 2/1995 | Wier | 73/115 |
| 5,390,546 | 2/1995 | Wodarczyk | 73/116 |
| 5,446,279 | 8/1995 | Hsu | 73/705 |

*Primary Examiner*—George M. Dombroske
*Attorney, Agent, or Firm*—Rader, Fishman & Grauer; Alexander D. Rabinovich

[57] ABSTRACT

A fiber optic spark plug integrated combustion pressure detector comprises the sensitive sensor head with "snap" action diaphragm to provide the temperature insensitivity to combustion temperature variations. The optical module is integrated into the electrical connector to eliminate open optical interfaces. The "snap" action and special diaphragm shape selectively increase detector knock and misfire discrimination. The pressure sensor can be made spark plug integrated or injected in block cylinder for combustion pressure sensing in engine.

3 Claims, 16 Drawing Sheets

FIBER OPTIC MISFIRE, KNOCK AND LPP DETECTOR FOR INTERNAL COMBUSTION ENGINES

BACKGROUND OF THE INVENTION

This disclosure contains the system description of a misfire, knock, and LPP (location of peak pressure) detector for internal combustion engine applications, as well as specific detector configurations. It is shown that the described system is realistic for the cost and performance requirements for current automotive applications. Misfire detector and diagnostic strategy is designed to comply with the California Air Resources Board's (CARB) legislation requiring misfire monitoring for each individual cylinder. This disclosure describes the commercial applications, system design, and the unique manufacturing processes of the system elements. Emphasis is made on the practicality of each applied technique and sensor configurations.

A commercially available fiber optic-based combustion pressure monitor with full pressure profile tracking is a questionable due to the high cost and required performance of current opto-electronic components. M.Waladartzyk A misfire and knock detector, sensing the absence or presence of the event, and in which cylinder it occurs, is much more feasible at the current level of technology. The less severe requirements for the signal/noise ratio and optical signal power allows the use of inexpensive opto-electronic components, thereby making this technology feasible for current real-world applications.

Reference U.S. Patents:

| | | |
|---|---|---|
| 4,453,218 | 6/1984 | Speride |
| 4,924,870 | 5/1990 | Wlodarczyk |
| 4,932,263 | 6/1990 | Wlodarczyk |

BACKGROUND INFORMATION

A simplified schematic of a fiber optic intensity-modulated pressure sensor (extrinsic) is depicted in FIG. A. The ends of 5a illuminating and 6a receiving lightguide, are combined by optical coupler 3a. The light emitted from LED (light emitting diode) 1a and light received by photodetector 2a, share the same optical path (lightguide) 7a. The distal end of this lightguide is arranged so that it is parallel to a deformable reflective surface (diaphragm) 4a. Numerous practical schemes exist and have been well studied for combining receiving and transmitting fiber ends in one coupling device In this configuration, for a specified optical fiber core diameter and N.A. (numerical aperture), the photodetector signal V is a function of the initial separation h between the lightguide and the reflective diaphragm and the change in this separation dh that occurs due to pressure and temperature deviations:

$$V = f\{h + / - dh(P,T)\}$$

where:

V=photodetector output (volts)

h=initial separation dh=pressure P and temperature T dependent displacement

One of the inherent disadvantages of a flexible diaphragm system, using displacement as a sensed variable, is environmental instability. To significantly reduce the environmental sensitivity to factors other than pressure, this system based on a convex spherical or conical diaphragm which acts as a "pressure switch" due to the characteristic "snap action" of this configuration (see FIG. H). This "pressure switch" can, in effect, be specified to provide high signal output during normal combustion firing events, while maintaining very low pressure sensitivity, and thus low signal output, during misfire events. This technique proposes to provide an environmentally insensitive measurement system unaffected by factors such as a temperature or vibration.

GENERAL SYSTEM CONFIGURATION

The general system configuration is shown in FIG. B. Misfire, knock, and peak combustion pressures occurring in the cylinder of an internal combustion engine cause known pressure deviations. These pressure deviations cause a corresponding displacement of the convex diaphragm 4b in the detector head 6b which is mounted in the combustion chamber. The output signal of the system is a function of the displacement of the diaphragm that occurs due to these pressure deviations. The determination of the occurrence of misfire, knock, and peak pressure events are then based on a comparison between calibrated threshold limits and the system signal output.

Light emitted by an IED 1b enters the one of the legs of a 2×2 fused coupler 2b and is split into two separate lightguides. One leg is coupled to reference photodetector 3b while the distal end of the other leg is affixed parallel to a reflective convex diaphragm 4b. The reference feedback photodetector 3b provides ambient (engine compartment) temperature compensation (from approximately −20 to +100C) in order to stabilize the LED power output. This reference photodetector 3b feedback loop also compensates for temperature related effects on the 2×2 coupler 2b. The feedback loop includes a unique metal coated fiber-based thermocouple 5b, which provides information to compensate for temperature effects on the convex diaphragm 4b (displacement and response). The measured signal V is a function of the distance h between the convex diaphragm 4b and receiving fiber 7b. This signal is detected by a measurement photodetector 8b and outputs a proportional voltage, which is fed into a operational amplifier OP1. The voltages of the amplifier OP1 are then received by active filters 9b land 10b. As discussed later in greater detail, the measured signal is transmitted through both active filters 15 and 16 to provide stable output 17 and 18 for misfire and knock and LPP judgment.

BRIEF DESCRIPTION OF THE DRAWINGS

FIG. 4 depicts an optional mounting scheme with the detector communicating with the combustion chamber through the engine water jacket.

FIG. 5 depicts a cross-sectional detailed view of the detector system package. This package has necessary environmental protection, EMI stability, and mechanical durability for automotive engine compartment applications.

FIG. 9 is a functional block diagram of the signal processing system. The standard system provides basic signal conditioning for all three channels (misfire, knock, and LPP) and supervises signal stability as a function of the environmental condition and engine internal temperature. For that system reliable judgment should be done in on board processor unit based on the engine calibration and using internal signal for improving signal to noise ratio.

FIG. 11 is a schematic of the comparator and notch filter for knock signal processing. For knock discrimination, the signal from buffer 10J is introduced to the notch filter. The filter is adjusted to a particular frequency which is derived from engine calibration or calculated based on known engine parameters.

FIG. 12 is a schematic of the comparator for the misfire discrimination. The misfire channel buffer output is introduced to active filter11 and then to comparator 2L with a predetermined calibration threshold level. The output TTL logic circuit 3L provides high or low level signal in correspondence to misfire occurrences.

FIG. 13 is a scheme for LPP (location of peak pressure) discrimination. The buffer output introduces AC pressure related signal to peak detector 1M. Since the peak detector output exceed TTL gate threshold level excitation signal generate a short plus with front slope correlated to peak of signal occurrence. This front slope identifies the spark angle advance and provides information on retarded or delayed ignition.

FIG. 15 is a functional block diagram of the knock detector. In general the knock detector may be described as a acoustic transducer with relatively simple analog electronic circuitry, which selects and amplifies the engines fundamental knock frequency. The detector will generate a flag when abnormal combustion occurs.

DETAILED DESCRIPTION OF THE INVENTION

Detector system constriction and packaging

Figure 3:
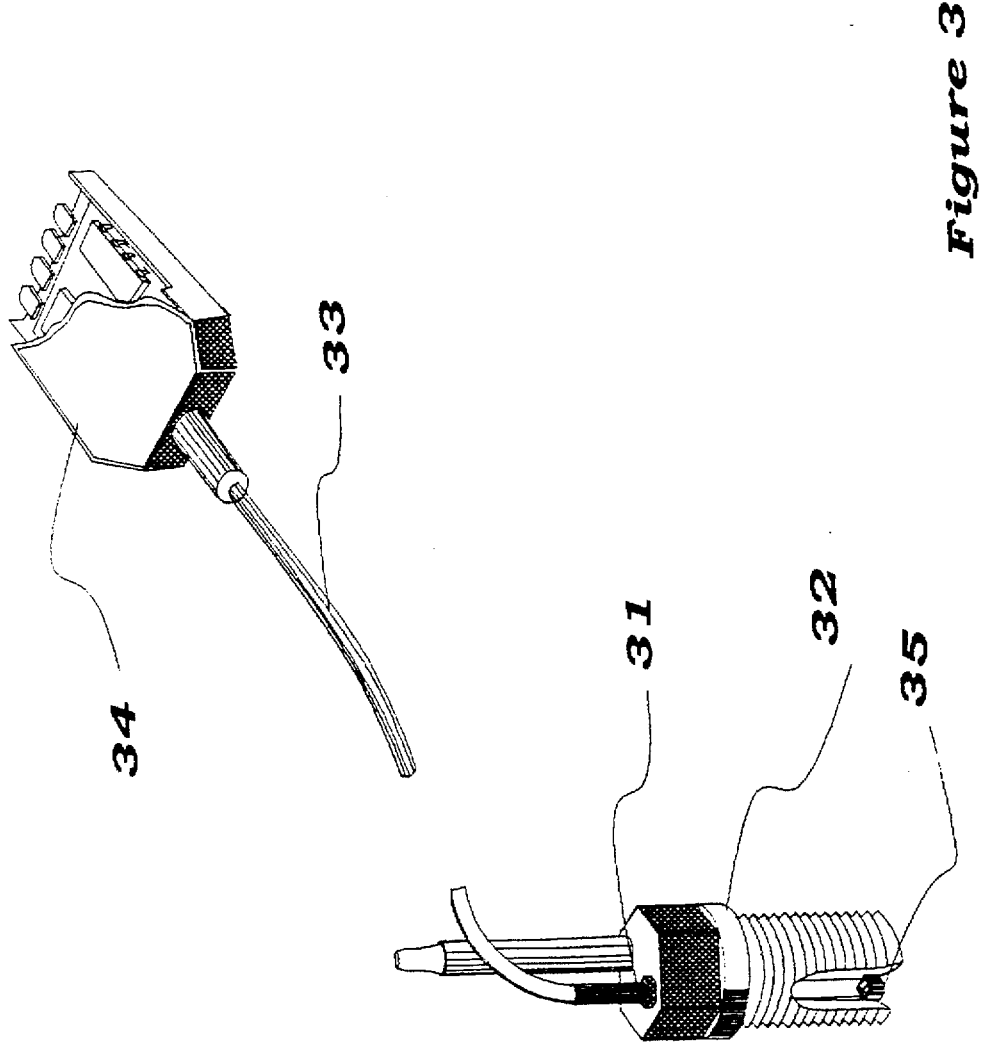
FIG. 3 is a concept drawing of the proposed spark plug integrated detector. This design is quite flexible and can be integrated into several different mounting locations for monitoring of in-cylinder combustion pressures. A concept diagram of the detector system integration into a modified spark plug is shown in FIG. 3.
Figure 4:
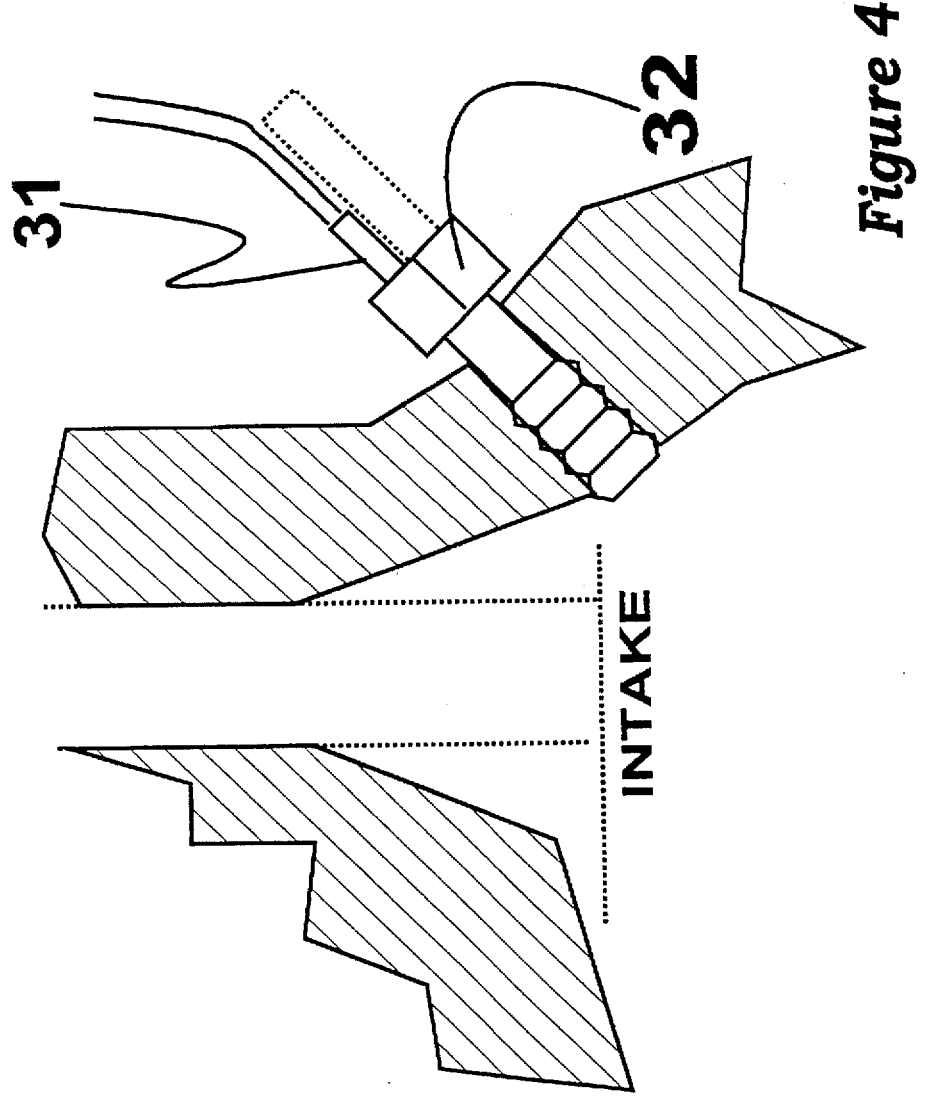
FIG. 4 is a concept drawing of the detector head mounted through the engine water jacket.

The proposed system provides individual cylinder misfire, knock and location of peak pressure LPP detection. This design is quite flexible and can be integrated into several different mounting locations for monitoring of in-cylinder combustion pressures. A concept diagram of the detector system integration into a modified spark plug is shown in FIG. 3. FIG. 4 depicts an optional mounting scheme with the detector communicating with the combustion chamber through the engine water jacket.

In FIG. 3, the miniature detector head $1c$ (<3 mm diam) is integrated into the spark plug $2c$ for each individual cylinder. The spark plug $2c$ is modified version which provides a communication path for the detector head with the combustion chamber. The detector head location is critical for the long term durability and is mounted in a recessed position in the spark plug as shown. This recessed mounting position provides sufficient dynamic response for this detector system, but would be unacceptable for a closed loop system requiring undamped absolute pressure profiles. This location experiences significantly lower combustion temperatures, thereby increasing the reliability the detector head components. The fiber optic jumper is integrated into a rugged cable $3c$ protects the fiber from mechanical interactions and breakage. The optoelectronic components are packaged in a hermetically sealed module $4c$.

Figure 5:
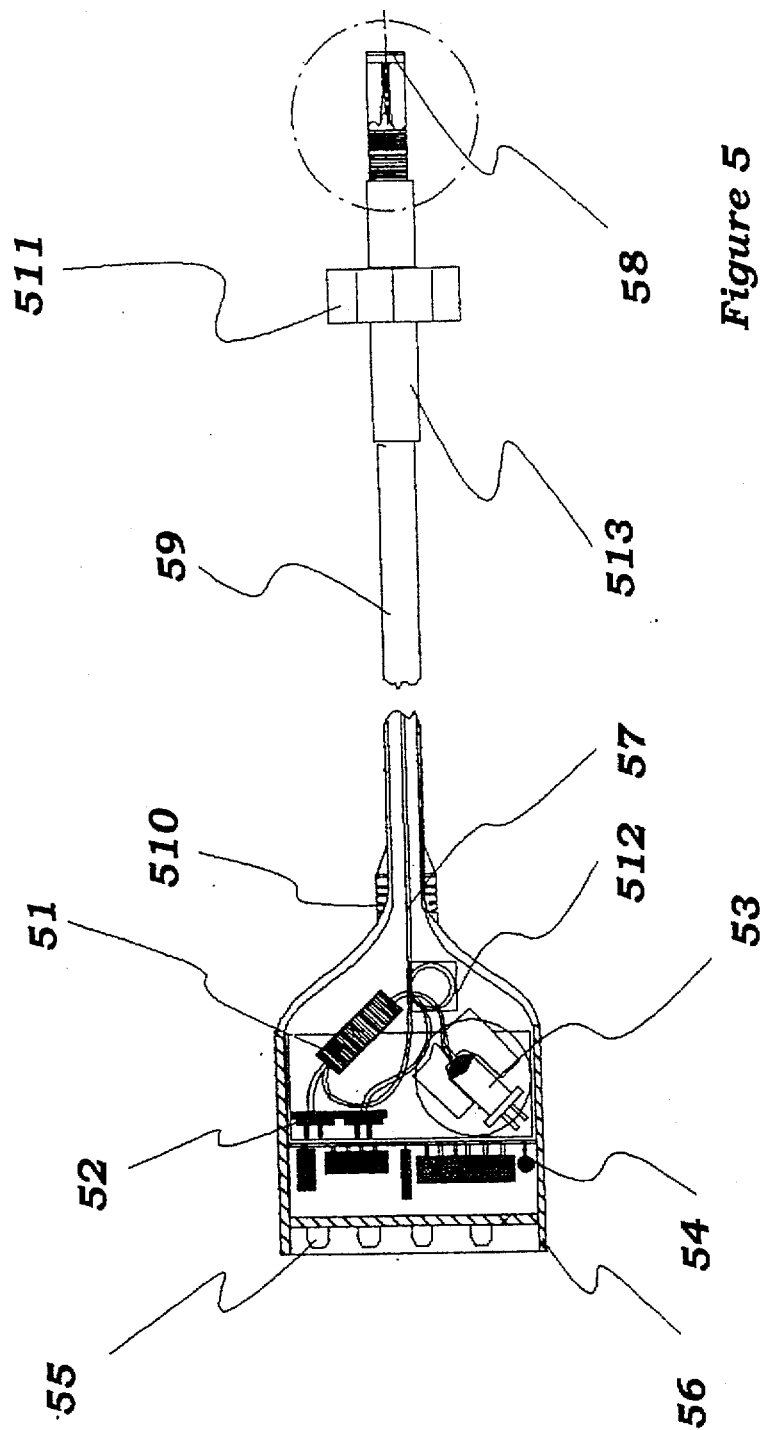
FIG. 5 is a cross sectional detailed view of the proposed system package including detector head design and opto-electronic configuration.

FIG. 5 depicts a cross-sectional detailed view of the detector system package. This package has necessary environmental protection, EMI stability, and mechanical durability for automotive engine compartment applications. The hermetically sealed opto-electronic module $6e$ contains the 2×2 optical fused coupler $1e$, measurement and reference photodetectors $2e$, LED/gradient index lens coupling package $3e$, required electronics (ASIC based) $4e$, mode stripper $12e$, and electrical connector $5e$. The outputs of the module are fully compatible with most engine on-board computer systems. The fused silica high N.A. (numerical aperture) launch/receive optical fiber $7e$ is in communication with the detector head $8e$ and protected by a rugged jacket $9e$. The transition between the detector head and rugged jacket is made with a crimp connection $13e$. The detector head mounting configuration and sizing is quite flexible and includes a standard thread and hexagonal wrench flats $11e$. The detector head can also be permanently integrated into the spark plug by welding or brazing. A strain relief $10e$ reduces bending stresses on the optical fiber between the module $6e$ and rugged jacket $9e$. The module case $6e$ is potted and hermetically sealed to provide the reliability and durability required for automotive applications.

The optical module, electronic module, and detector head package are discussed in greater detail in the following sections.

Optical Module Description and Packaging

Figure 6:
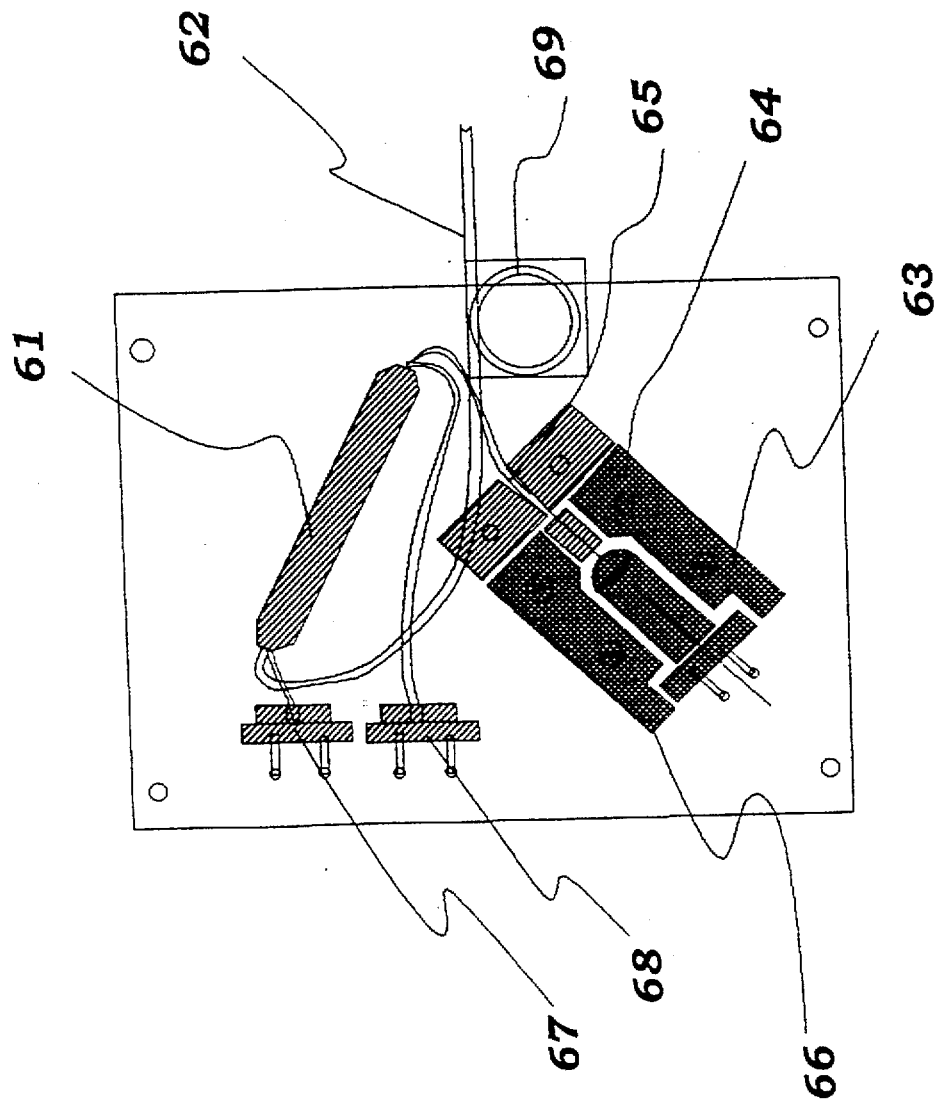
FIG. 6 is a detailed optical module description and packaging

The optical integrated module is an important part of the proposed detector system. The proposed module design FIG. 6 significantly reduces total system cost and provides satisfactory detector performance. This system eliminates the use of costly, fragile optical fiber connections, which may cause deterioration of the optical signal due to the presence of oil, dirt and engine and road vibration. The optical module utilizes a conventional 2×2 fiber optic fused coupler $1f$, in which the output leg $2f$ is in communication with the detector head. This output leg can either be metallized for detector head integration or fusion spliced to a metallized fiber optic jumper. Compared to the use of optical connectors, splicing fiber to fiber has negligible optical power losses (<0.4 dB), and creates a durable monolith fiber optic structure, easy to automate in high volume production.

The light emitting diode 3f to fiber alignment is critical for adequate optical power and signal to noise performance. Conventional schemes use a costly double ball lens LED, which requires a complex alignment technique that is too cost prohibitive for automotive applications. The proposed design uses a gradient index lens 4f and inexpensive ED 3f. These components are packaged in a rugged self-aligning housing 6f that provides a simple and cost effective method of obtaining LED 3f to fiber 5f coupling which will provide adequate power output. Temperature compensation of the LED and fused coupler output is provided by an LED/ coupler to reference photodetector 7f feedback loop. The measurement photodetector 8f is coupled to the measurement leg of the 2×2 coupler. A mode-stripper 9f reduces the bend and temperature sensitive high order light modes of the launch/receive lightguide, thereby providing more bend and temperature stable output.

Detector Head Description and Packaging

Figure 7:
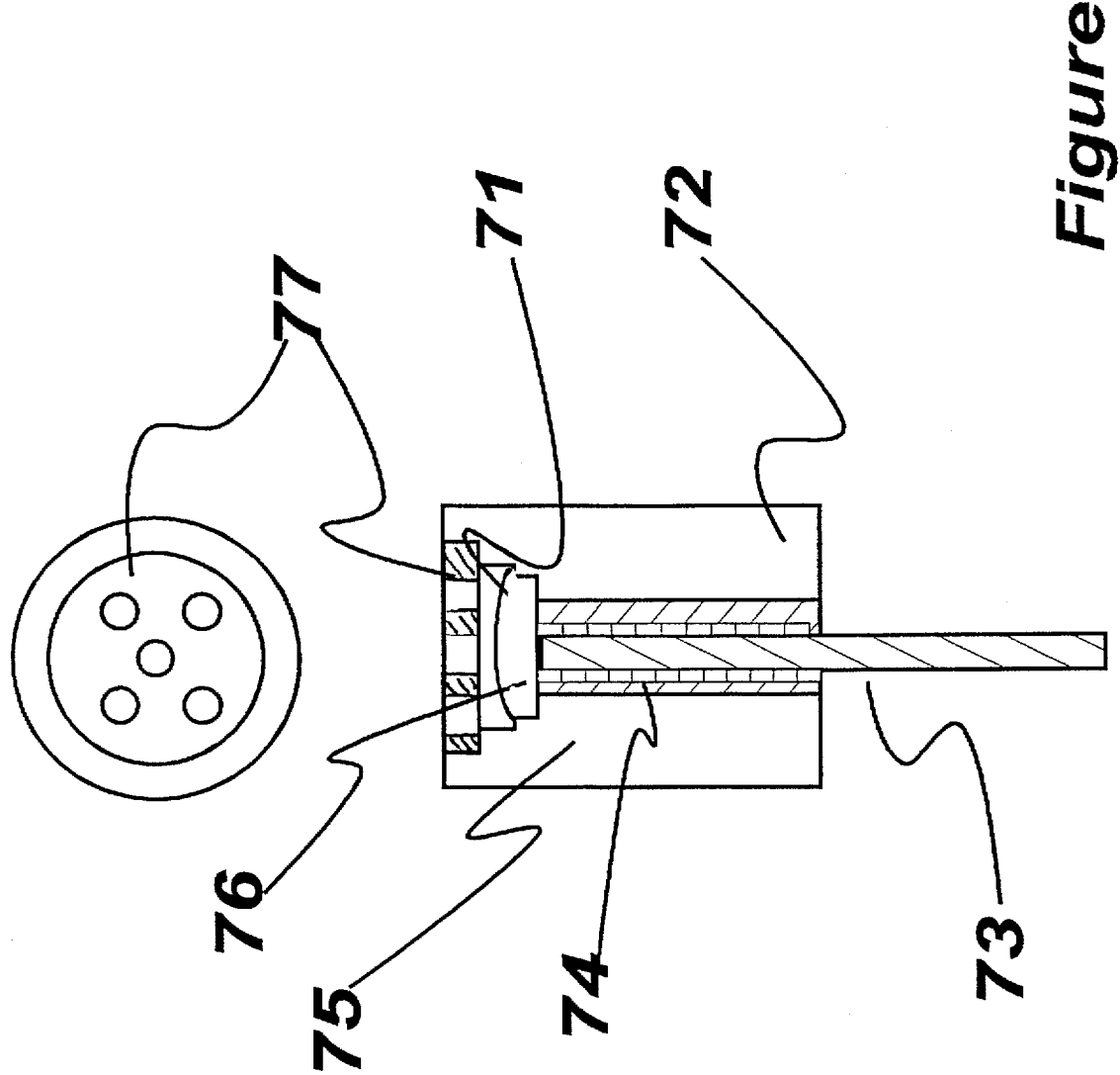
FIG. 7 is a cross sectional detailed view of the detector head.

A cross sectional schematic of the detector head configuration is shown in FIG. 7 A convex spherical or conical diaphragm 1g, made from a high-temperature metal alloy with high elastic properties, is hermetically affixed to a metal alloy housing 2g of similar material, as shown. High numerical aperture optical fiber 3g consists of a high temperature fused silica core and cladding and has a metal coating 4g which is deposited on the optical fiber using a vacuum deposition or other electrolyze coating process. The metallized optical fiber 3g is affixed to the housing 2g with a brazing alloy 5g, and then highly polished at the distal end. This creates a hermetically sealed chamber 6g, which is filled with an inert gas. The inert gas prevents oxidation of the reflective surface of the convex diaphragm when operating for extended periods at high temperatures. Flame baffle 7g is affixed to housing 2g as shown and consists of a metal alloy plate with several passages allowing communication of combustion pressure with diaphragm 1g. The flame baffle acts to inhibit the combustion flame from making direct contact with the diaphragm, thereby reducing its transient thermal sensitivity.

Figure 8:
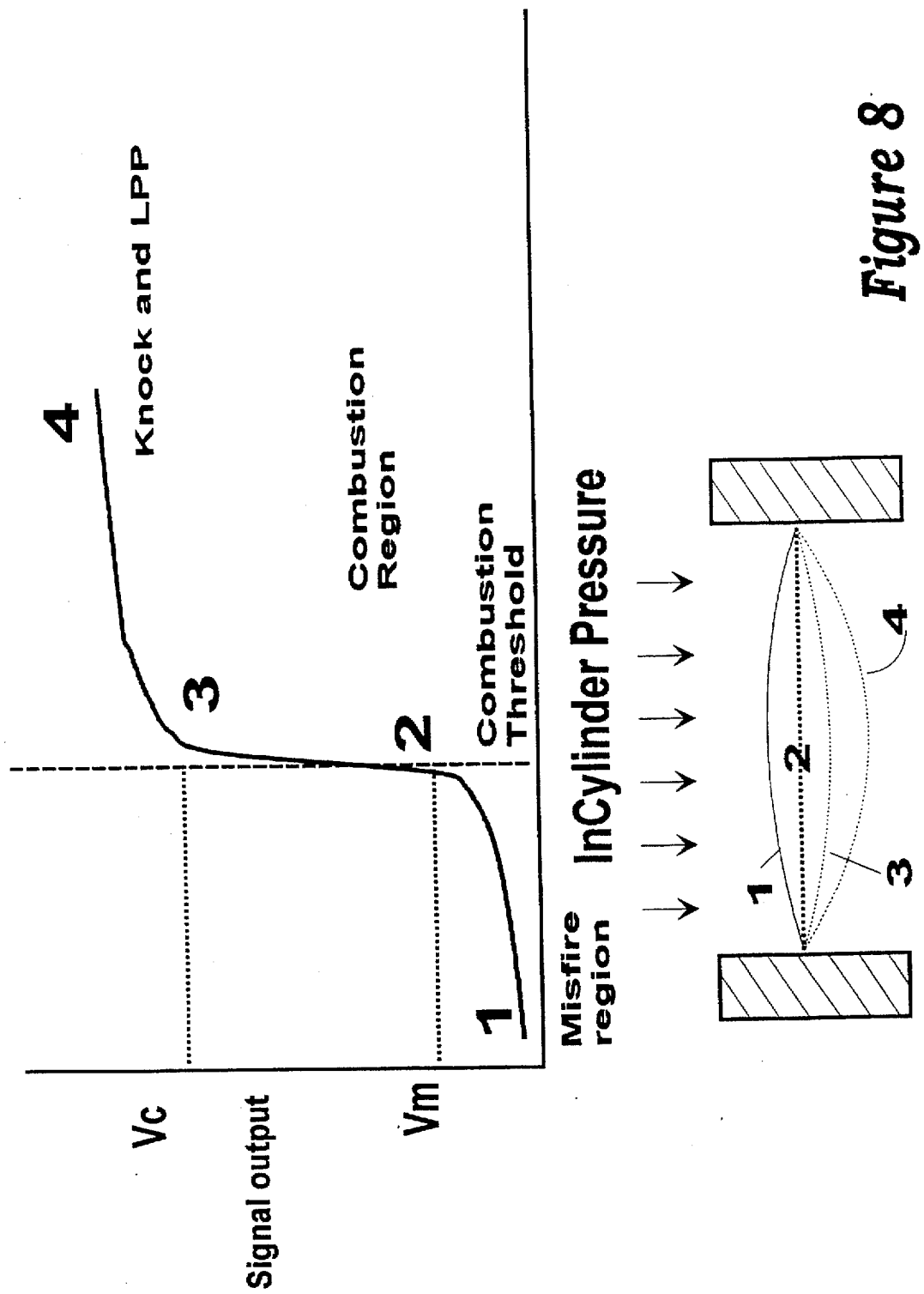
FIG. 8 is a description of the convex diaphragm response characteristics. A detailed schematic of the deflection characteristics of the convex spherical or conical diaphragm is shown in FIG. 8.

A detailed schematic of the deflection characteristics of the convex spherical or conical diaphragm is shown in FIG. 8. A detailed schematic of the deflection characteristics of the convex spherical or conical diaphragm is shown in FIG. 8. Because of the diaphragm is structurally stiffened by the convex shape, it has relatively low sensitivity to pressures levels below a defined threshold pressure. At this threshold pressure, the diaphragm becomes almost infinitely sensitive as very little additional pressure causes a relatively large diaphragm displacement or "snap." The response of this type of diaphragm is defined by the convexity ratio A/t (where A is defined as the deviation of the center of the convex diaphragm from that of a flat diaphragm and t is the diaphragm thickness) and the diaphragm diameter.

Figure 9:
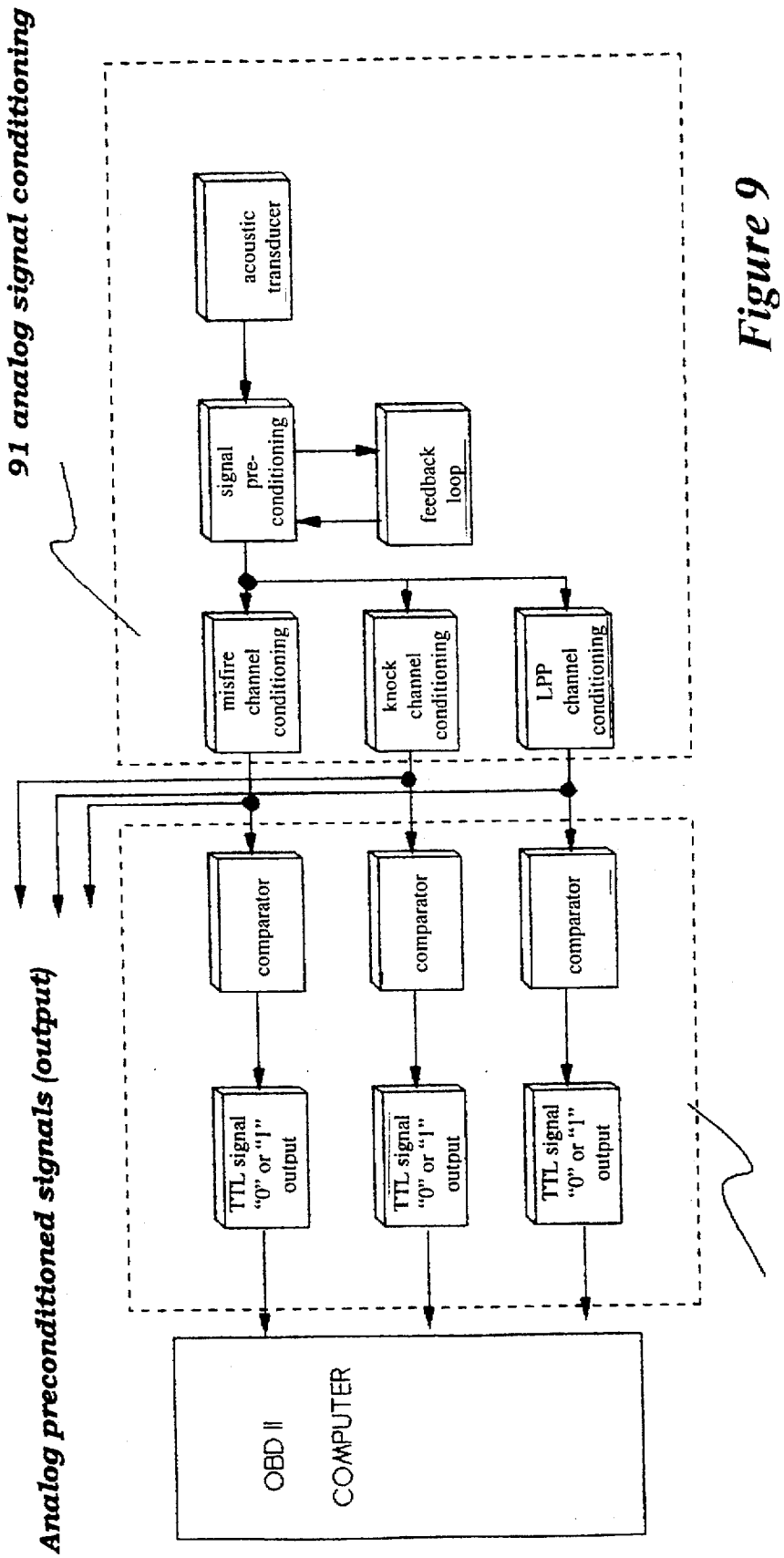
FIG. 9 is a analog and digital signal processing concept.

For misfire detection, the diaphragm is designed to "snap" (path 2–3, FIG. 8) at a calibrated combustion pressure threshold as shown in FIG. 9. This threshold is defined to be just below the minimum or no-load combustion pressure in the cylinder. Below this threshold is the misfire region (path 1–2, FIG. 8) where cylinder motoring pressures will occur, corresponding to a maximum signal output of $V_M$. Above this threshold, minimum normal combustion pressures will occur, corresponding to a minimum signal output of $V_C$.

Because of the magnitude of the modulated signal change ($V_C-V_M$), corresponding to a misfire event, the system will have selective sensitivity for detection of these events. At pressures above the combustion threshold, the shape of the diaphragm will be concave which will provide the response (path 3–4, FIG. 8). It is in this response region that knock and peak pressures will occur and be detected.

Figure 1:
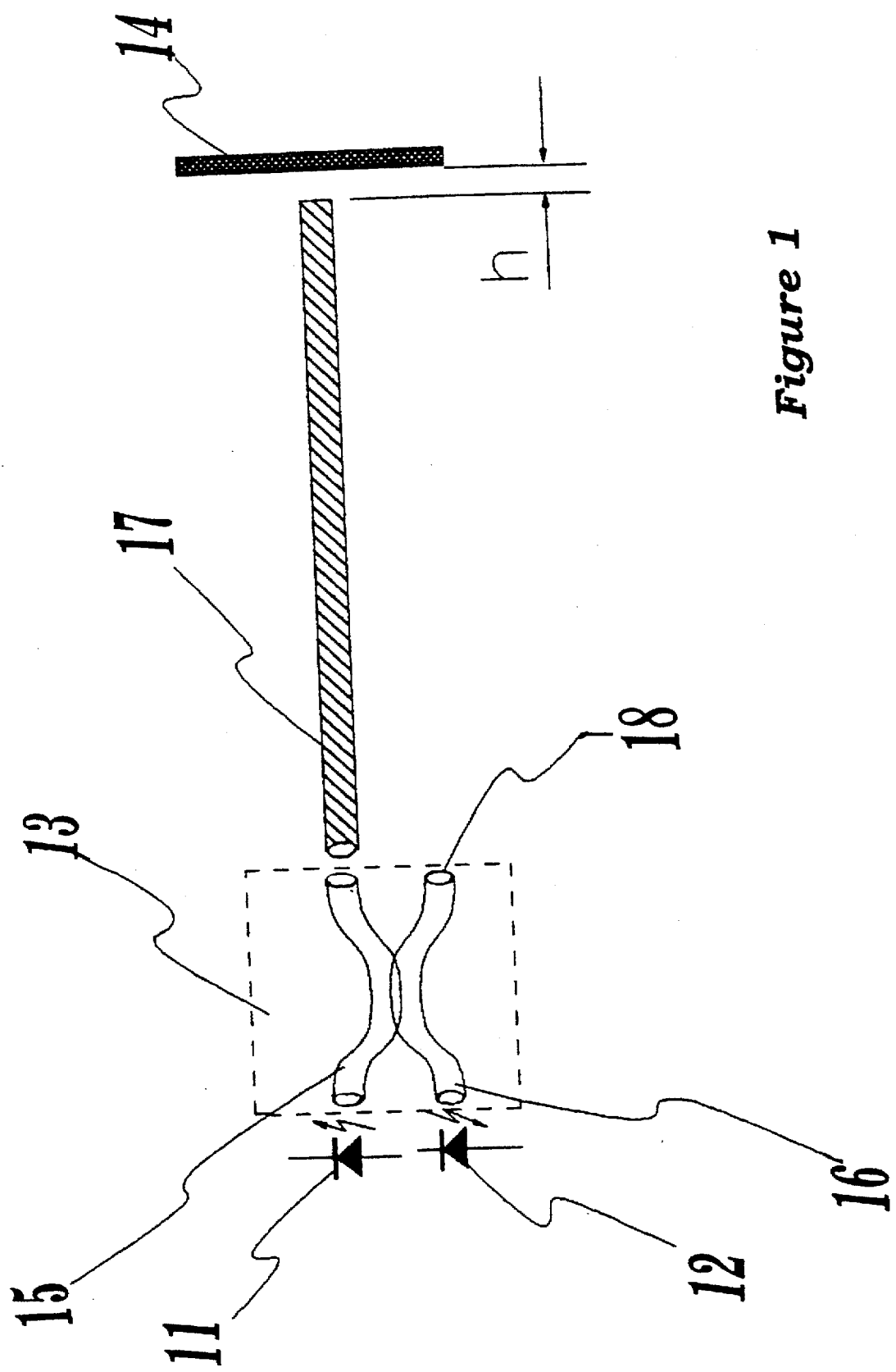
FIG. 1 is a generic schematic for (extrinsic) intensity modulated sensor system.
Figure 2:
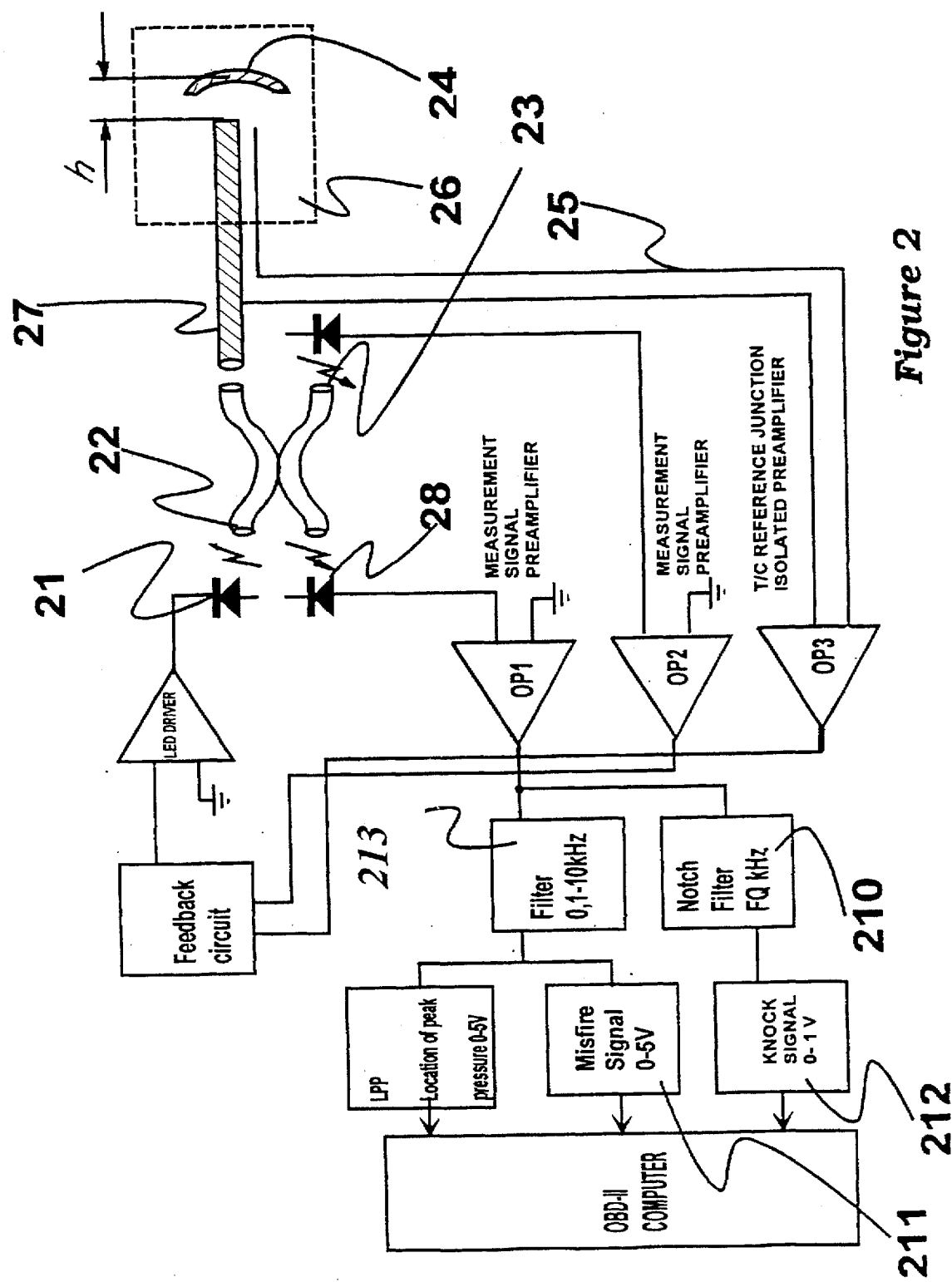
FIG. 2 is a general system schematic of the misfire, knock, and LPP (location of peak pressure) detector.

A unique low-cost detector head temperature compensation scheme is also described here. Rapid response temperature monitoring of the detector head can be achieved by utilizing a conventional thermocouple lead material as the metal coating for the optical fiber. In this case, the metal is deposited along the entire optical fiber length in thicknesses of 10 to 50 microns by drawing the optical fiber through a crucible of the molten metal during the manufacturing process. An insulated T/C lead of an appropriate paired material, selected to form a T/C junction with the metal coating, is then brazed in the detector head at the distal end forming a grounded T/C junction, see FIG. 2. The proximal end of the T/C is fed into an isolated T/C preamplifier and becomes an integral part of the system feedback circuit.

The detector head can be sized for several different mounting configurations for in-cylinder monitoring applications. For spark-plug integration, the detector head can be sized as small as 3 mm in diameter as shown in FIG. 3. For mounting through the engine water jacket, larger diameters can be accommodated as shown in FIG. 4. Also, because absolute, un damped combustion waveforms are not necessary for this detector system, the detector head can be mounted in a recessed position relative to the combustion chamber, thereby increasing the life of the detector head elements.

The advantages of this detection system are: 1) selective sensitivity to pressure deviations occurring during misfire events 2) high signal/noise ratio for misfire detection 3) insensitivity to other environmental factors such as temperature, vibration, and EMI.

Electronic Module Description and Packaging

Two system configuration proposed herein based on desirable complicity, cost and compatability with present on board diagnostic system. The emphasis of second part of that proposed system is made on more signal evaluation inside on board processor unit where significant computational power may reduce pre processing and complexity of the detector analog output.

FIG. 9 is a functional block diagram of the signal processing system. The standard system provides basic signal conditioning for all three channels (misfire, knock, and LPP) and supervises signal stability as a function of the environmental condition and engine internal temperature. For that system reliable judgment should be done in on board processor unit based on the engine calibration and using internal signal for improving signal to noise ratio. The optional system carries out judgment of misfire and knock events and provides TIL "0" and "1" as indication of the occurrence of these events. The judgment unit should be calibrated in respect to particular engine family.

Figure 10:
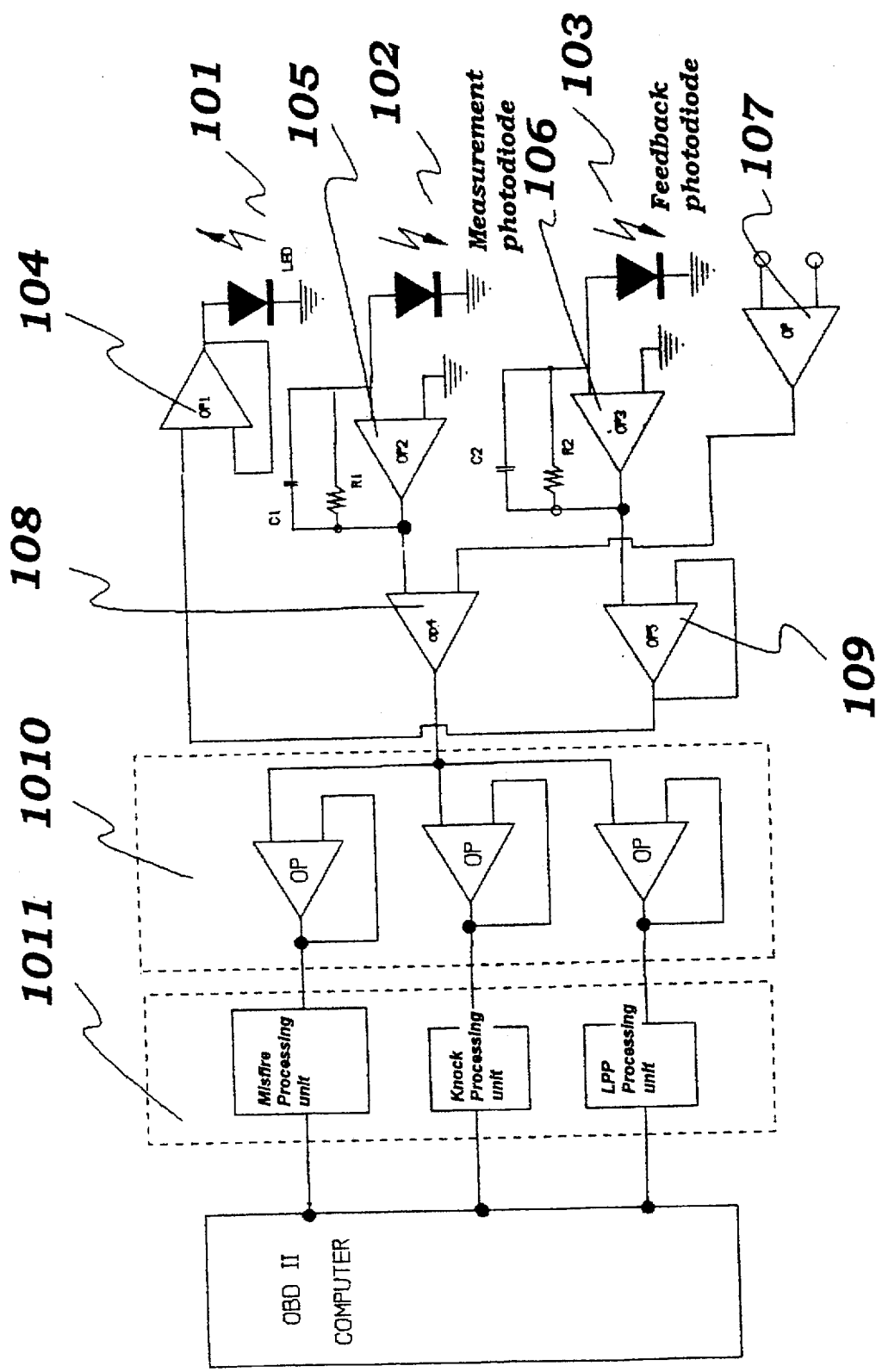
FIG. 10 is conceptional system schematics.

FIG. 10 illustrates the analog conditioning circuitry for all three channels. The LED driver 4J provides stable current for LED 1J. This stable driving current is provided by a feedback signal from photodiode 3J. The feedback loop functions such that when the LED optical power drops due to an increase in engine compartment temperature, amplifier 6J output will decrease and increase invertor amplifier 9J output. This output voltage will maintain stable LED optical power during engine compartment temperature variations.

The measurement photodiode 2J excites a voltage proportional to combustion pressure. This voltage is directed to the first stage low noise amplifier 5J. The amplifier output provides signal for variable gain amplifier 8J, which is intended to correct detector temperature sensitivity. The thermocouple signal is directed to amplifier 7J which provides input signal for variable gain amplifier to compensate gain in accordance with detector head temperature.

The variable gain amplifier 8J provides signal to buffers 10J. Those buffers are low noise and high impedance operational amplifiers to distribute measurement signal in three processing channels. This channels execute signal processing, discriminate corresponding events occurring from engine noise and output TTL signal in accordance with consequences events 11J.

Figure 11:
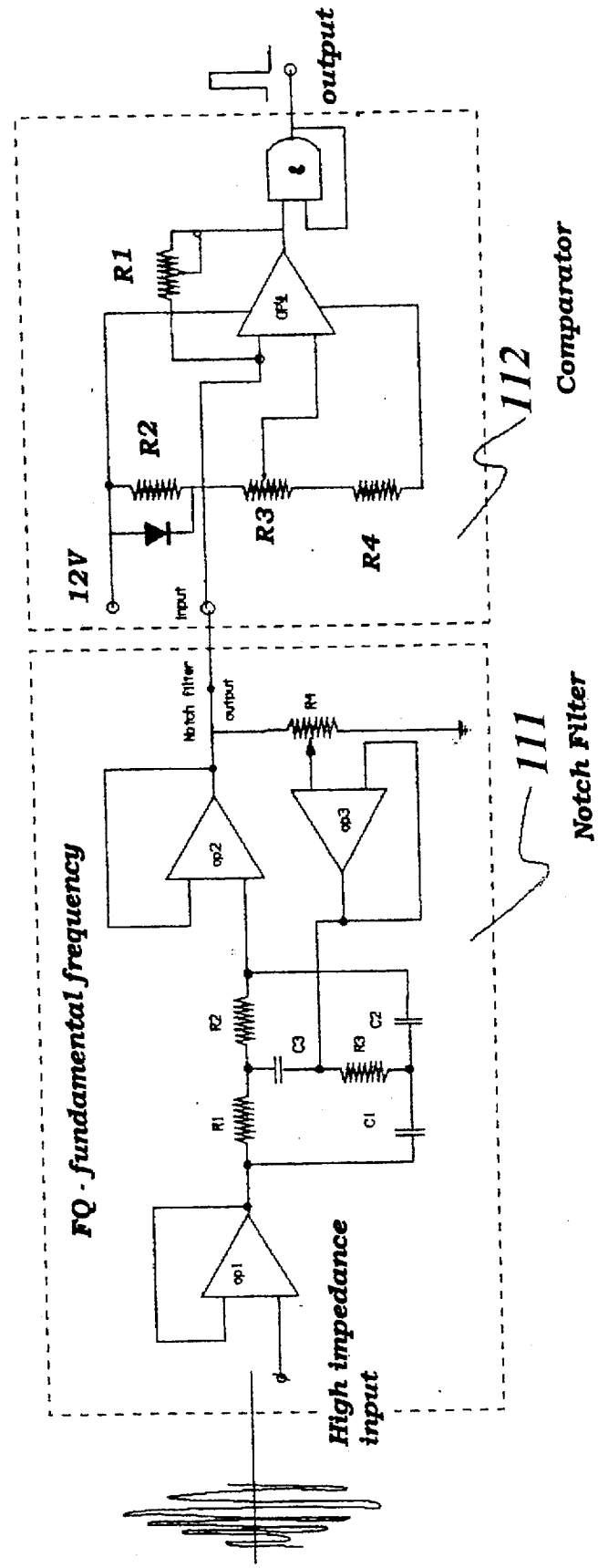
FIG. 11 is a knock channel schematics

FIG. 11 is a schematic of the comparator and notch filter for knock signal processing. For knock discrimination, the signal from buffer 10J is introduced to the notch filter. The filter is adjusted to a particular frequency which is derived from engine calibration or calculated based on known engine parameters.

Figure 12:
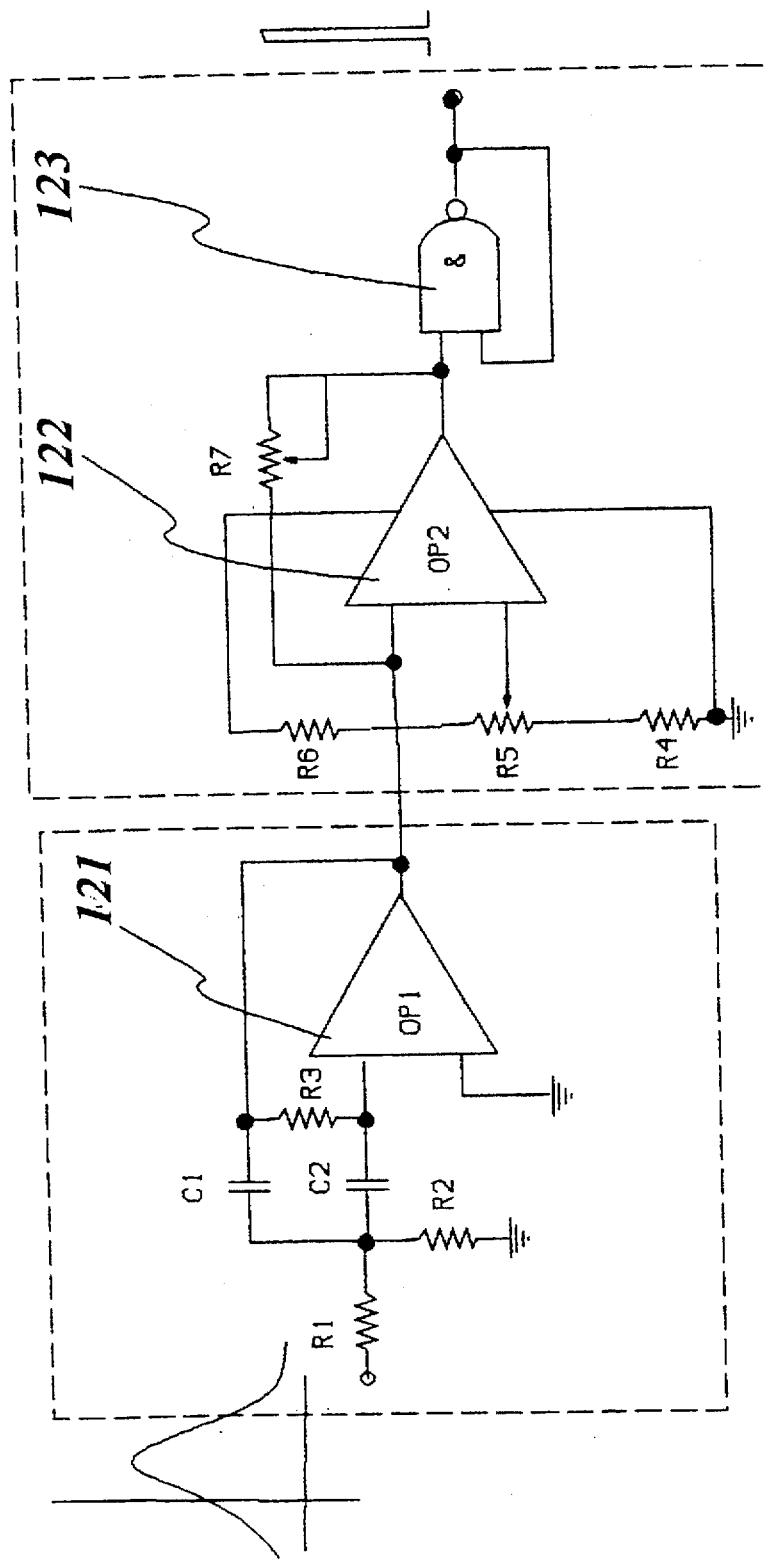
FIG. 12 is a misfire channel schematics.

FIG. 12 is a schematic of the comparator for the misfire discrimination. The misfire channel buffer output is introduced to active filter 11 and then to comparator 2L with a predetermined calibration threshold level. The output TTL logic circuit 3L provides high or low level signal in correspondence to misfire occurrences.

Figure 13:
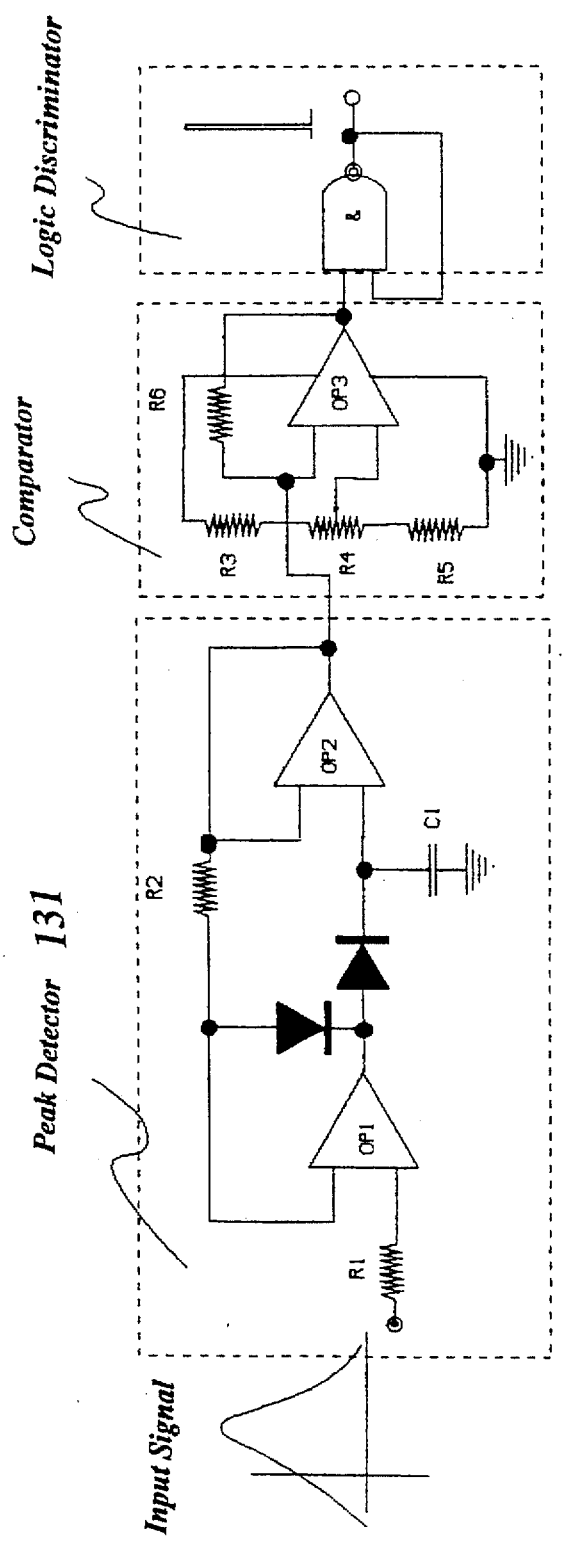
FIG. 13 is a LPP channel schematics

FIG. 13 is a scheme for LPP (location of peak pressure) discrimination. The buffer output introduces AC pressure related signal to peak detector 1M. Since the peak detector output exceed TTL gate threshold level excitation signal generate a short plus with front slope correlated to peak of signal occurrence. This front slope identifies the spark angle advance and provides information on retarded or delayed ignition.

All electronics are based on integrated circuitry to reduce overall sensor processing unit size. Circuitry insulated by moisture resistant compound and hermetically sealed after adjustment.

SYSTEM ALGORITHMS

This section describes the specific algorithms for misfire, knock, and LPP determination.

Misfire Detector

Misfire is defined to be the lack of combustion in a cylinder due to absence of spark, poor fuel metering, poor compression, or any other cause. It is detrimental to internal combustion engine operation. Excessive misfire in an engine causes catalyst damage, which results in high exhaust emission levels. The legal requirement established by the California Air Resources Board specifies that the diagnostic system shall monitor engine misfire and shall identify the specific cylinder misfiring or identify multiple cylinders misfiring. For 1997 and later year vehicles, misfire shall be monitored continuously and under all positive torque engine speeds and conditions. The proposed misfire detector meets all of these requirements and is completely compatible with any present on board diagnostic system.

The engine misfire detector is comprised of a fiber optic detector, as previously described, for monitoring combustion pressures occurring in the cylinder. The detector is connected to a variable gain amplifier and gain control circuit. The output of the amplifier is compared with a variable threshold in a comparator to provide a misfire detection signal. The misfire detector as explained previously utilizes a "snap diaphragm" function (see FIG. H). The convex diaphragm is relatively insensitive to low cylinder motoring pressures which occur during misfire. This corresponds to a low signal converted by TTL logic to a "0" signal level. Normal combustion, which exceeds the combustion threshold will be converted by TTL logic to a "1" signal level.

Calibration of the combustion threshold may be performed for a particular engine family and on-board diagnostic system for reliable misfire discrimination. The motoring pressure range directly related to the characteristics of a particular engine family. Once the calibration coefficients are determined, they can be stored in the ROM of the on board computer.

Figure 14:
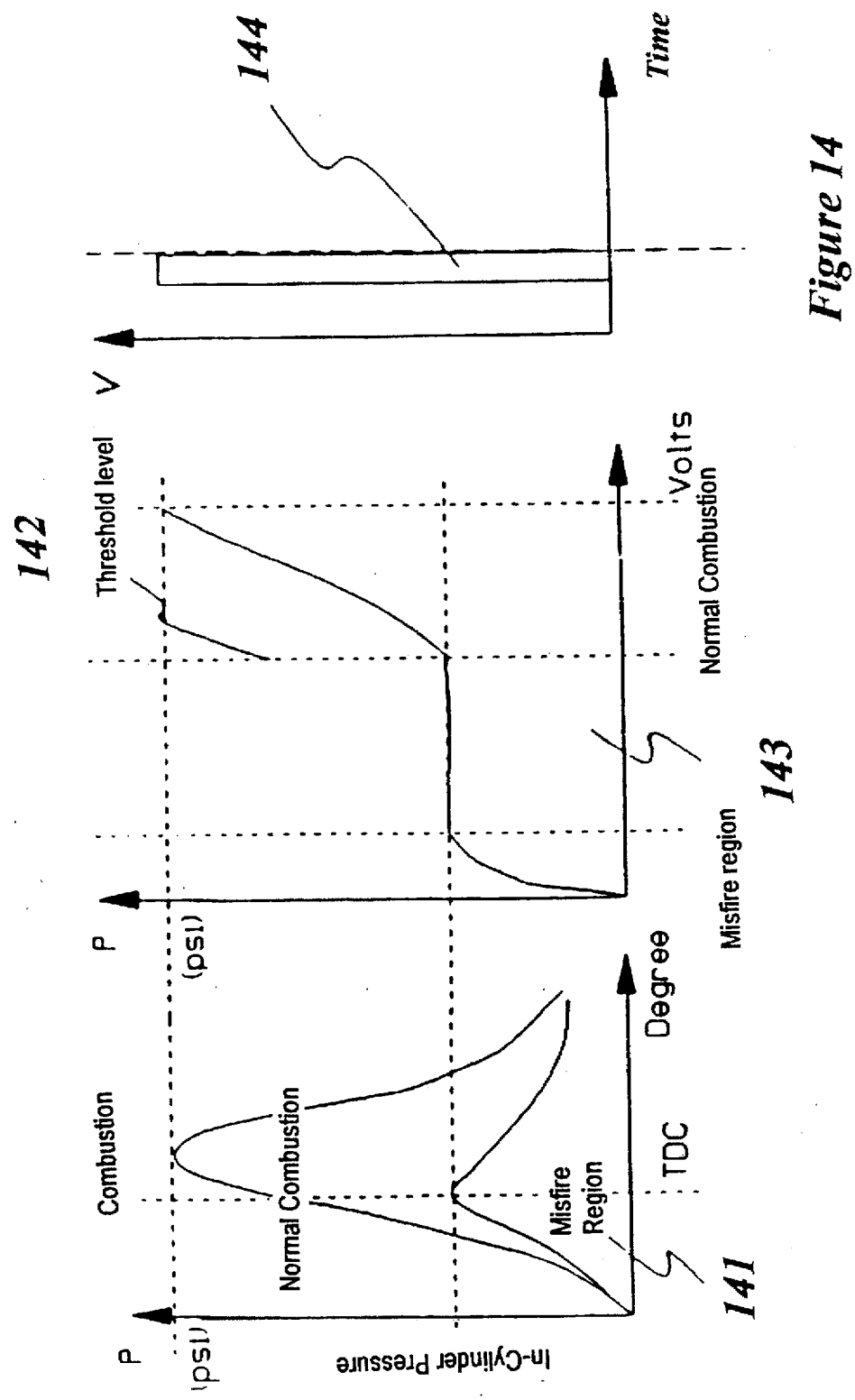
FIG. 14 is a misfire discrimination diagram FIG. 14 details misfire signal processing. In depicts a typical pressure threshold comparison between normal combustion and the misfire event. In general the normal no-load combustion pressure is expected to exceed motoring pressures by 500 to 700%. This pressure variation will result in the "snap" response of the convex diaphragm as shown in 2n. This diaphragm response will, in turn, result in the output signal as shown in 3n.

FIG. 14 details misfire signal processing. In depicts a typical pressure threshold comparison between normal combustion and the misfire event. In general the normal no-load combustion pressure is expected to exceed motoring pressures by 500 to 700%. This pressure variation will result in the "snap" response of the convex diaphragm as shown in 2n. This diaphragm response will, in turn, result in the output signal as shown in 3n.

Knock Algorithm

A combustion control system with knock detection will improve engine performance and fuel economy. Minimizing the spark knock is a major aspect of many engine control systems because knock is both detrimental to the engine and objectionable to the customer. Knock control allows the engine to be calibrated closer to its optimum operating point with corrections made only when knock actually occurs, as opposed to conservative engine design to avoid knock under all operating conditions. Also, controlling knock reduces the vehicle octane requirement, allowing the use of lower octane fuels. The fundamental frequency of the knock wave is a function of the distance it travels (cylinder bore diameter), the local speed of the sound, and the average bulk temperature of the combustion chamber. The relation can be expressed by the following equation:

$$Fn = Kc(C/B) = (Kt/B)T^{0.5}$$

Fn=fundamental knock frequency
Kc,Kt=constant
C=local speed of sound
T=bulk combustion chamber temperature
B=cylinder bore diameter The current technology knock sensors measure combustion gas vibration at a remote location, such as the engine block. High engine speed and load conditions cause increased mechanical vibration which results in a decreased signal to noise ratio for this type of system, reducing its ability to properly detect the knock event. The proposed knock detector extracts knock information directly from the combustion pressure output in the combustion response region (path 3-4, FIG. 9) of the convex diaphragm. Due to inherent the high natural frequency and sensitivity of the thin diaphragm (and diaphragm location) it can sense the occurrence of the fundamental knock frequency directly from combustion gases and provide signal output for reliable knock determination.

Figure 15:
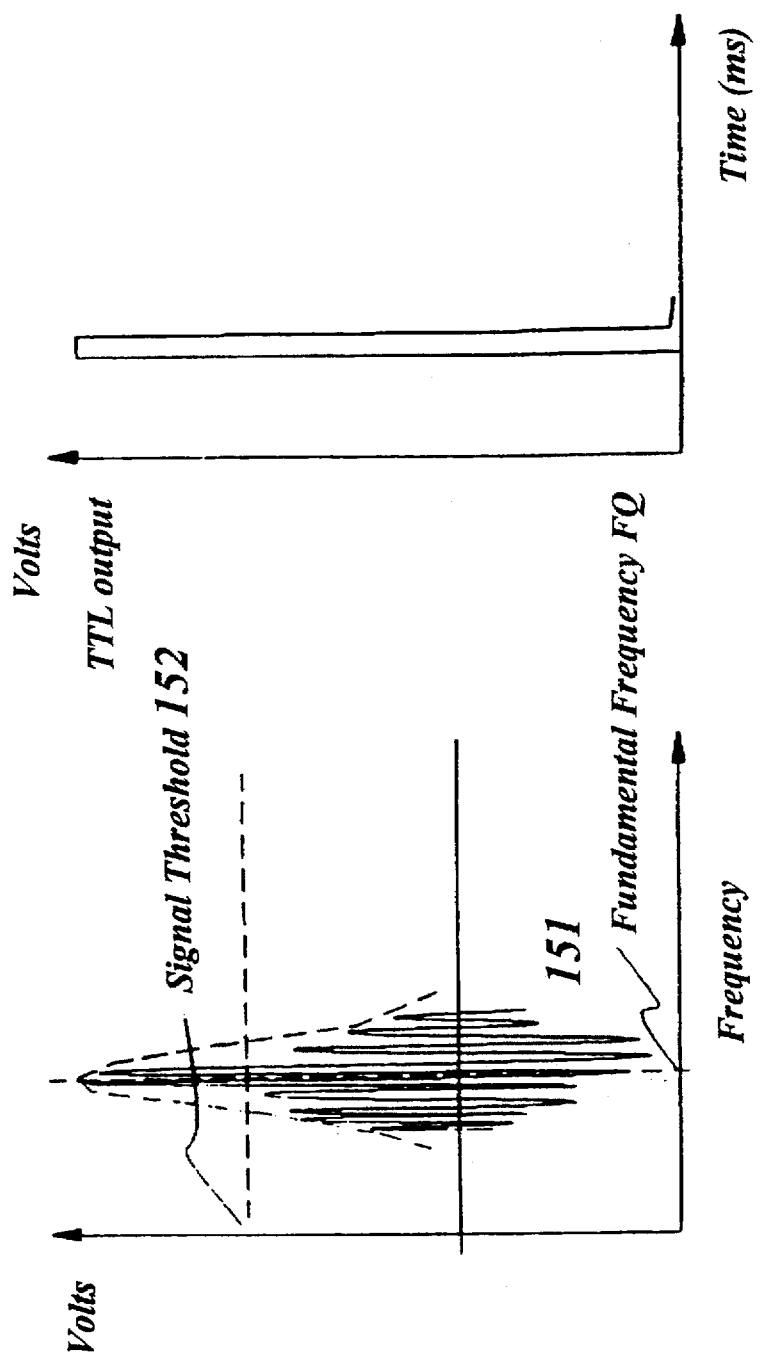
FIG. 15 is a Knock discrimination diagram
Figure 16:
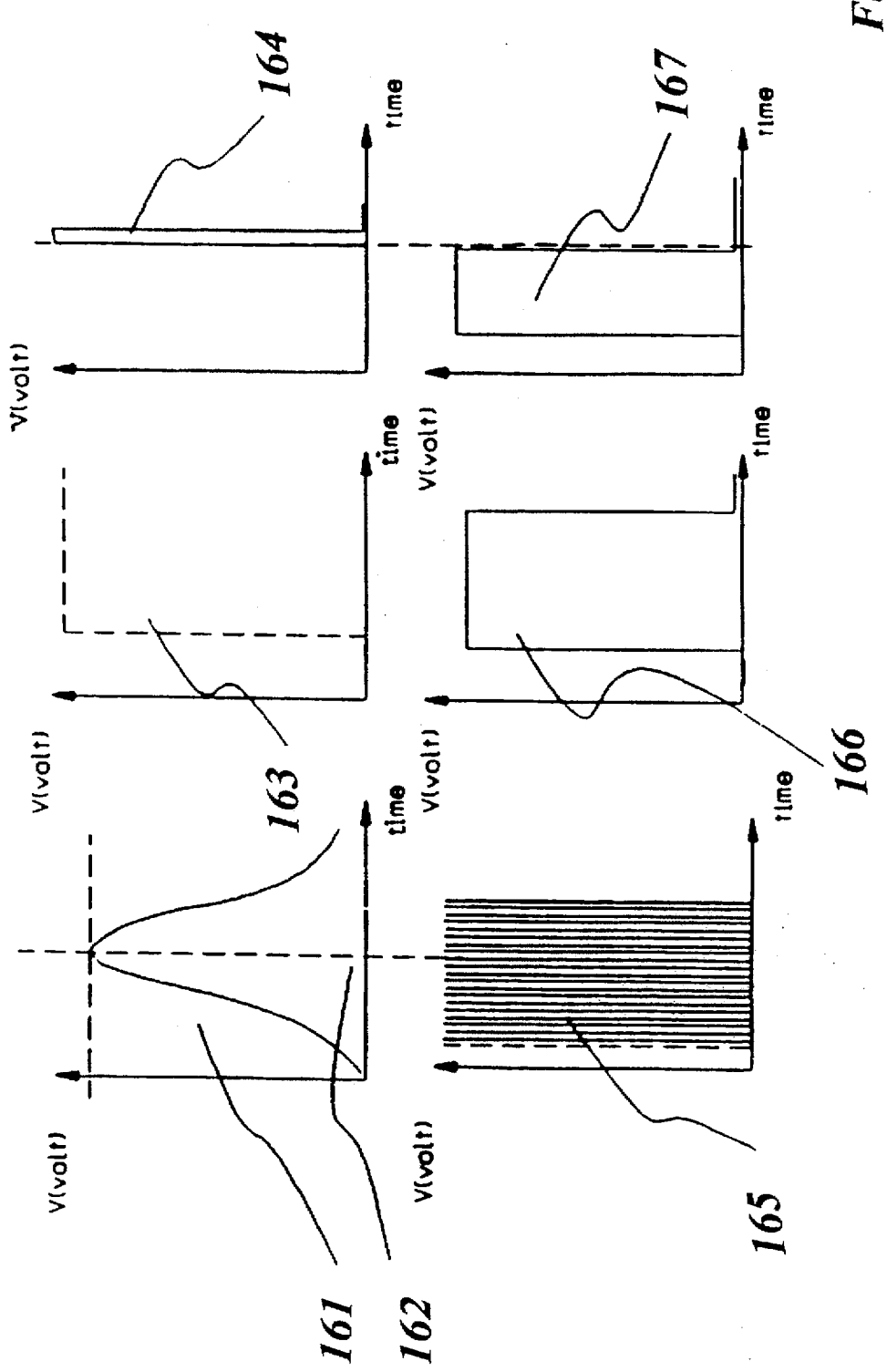
FIG. 16 is a LPP discrimination diagram The peak detection is performed simply by measuring highest signal output of the detector during the combustion cycle.

FIG. 15 is a functional block diagram of the knock detector. In general the knock detector may be described as a acoustic transducer with relatively simple analog electronic circuitry, which selects and amplifies the engines fundamental knock frequency. The detector will generate a flag when abnormal combustion occurs.

In normal operation, the acoustic spectrum includes only a small peak at the chamber fundamental frequency—slightly above the background noise with normal combustion frequency being predominant (fundamental mode of the engine chamber). When knock occurs this peak becomes large. Several algorithms for knock signal discrimination are proposed here. The detector output is fed to a signal conditioner block common for all proposed techniques. 1*o* shows the generic schematics of this block. The amplified output AC signal V pass filter 2*o* to eliminate engine operational noise. This narrow notch filter adjusted tight to fundamental frequency. Therefor the output detected signal represents knock occurrence. If summary knock signal will exceed predetermined during calibration threshold, knock occurrence decision will made. Calibration procedure may include knock simulation with sequential measurement of the knock output signal for threshold identification. Reliable judgment of the knock assurance may be made on the base of series of knock events (2-3 cycles).

LPP (Location of Peak Pressure)

Modern engines are built with spark timing and EGR (emission gas recalculation) calibrations that are established after extensive testing to meet predetermined goals of emission drivebility, economy, performance, safety, and cost. The location of peak pressure has been found to be a direct indication of optimum combustion for variety of engines. Advanced or retarded pressure peaks can occur during the combustion cycle. These peaks are not optimum and may result from factors not controlled during the vehicle calibration. Advanced or premature combustion may result in high frequency knock formation. Slow or retarded combustion peaks also cause deteriorated engine performance. Optimum efficiency combustion occurs near 15° TDC 2*p* (top dead center). The proposed system provide adaptive, clear signal for the engine control module, which in general may utilize algorithms (timing diagram FIG. P). The peak detection is performed simply by measuring highest signal output of the detector during the combustion cycle. A production crankshaft positioning sensor must be used in conjunction to determine the location of the peak pressure and engine RPM 6*p*. Output from this Hall Effect sensor will provide 60 or 45 degree pulses profile ignition pickup (PIP) of crankshaft position 6*p*.

A combustion signal above misfire region generate pressure waveform 1 p, this signal will be analyzed by standard on-board diagnostic system. The sensor analog peak discriminator provide pulses 3*p* to digital trigger which generates short pulse 4*p* in response on the peak pressure. Conventional crank shaft position sensor provides PIP 6*p* (profile ignition pickup) signal for particular cylinder discrimination. The location of the peak pressure 1*p* may be obtained by counting E-clock pulses 5*p* occurring in a particular cylinder. LPP will be determined based on a comparison of the crankshaft TDC position 7*p*. This information may then be converted in retarded or advanced ignition spark timing 8*p*.

I claim:

1. A fiber optic pressure detector system for measuring indicative characteristics of combustion pressure within a combustion chamber of an internal combustion engine, said system comprising:

a housing with an opening into said combustion chamber;

a convex diaphragm located at said opening, said diaphragm being adapted to change its shape in response to combustion pressure applied thereto;

at least one optical fiber placed in said housing and having a sensing tip placed adjacent to said diaphragm and aimed thereat, and an injecting tip where light is injected in said fiber;

a means for emitting a light signal into said at least one optical fiber, to thereby have said light signal reflected from said diaphragm and thus modulated in accordance with a diaphragm response indicative of said applied pressure;

a feedback means responsive to temperature changes in said combustion chamber, said feedback means being connected to said emitting means and thus stabilizing an output power of said light signal of said emitting means;

a means for receiving said modulated light signal reflected from said diaphragm and transforming said modulated light signal into an electric signal responsive to combustion pressure;

a reference means for providing precalibrated reference thresholds, said reference means being connected to said receiving means, and a processing means for multichannel processing said electric signal, to thus detect misfire occurrence, knock occurrence, and peak pressure location, said emitting means, receiving means, and processing means being constructively combined in a stand-alone structure.

2. The system as claimed in claim 1, wherein said housing is provided with a groove located in close proximity to said diaphragm in such a way that combustion pressure increase will force said diaphragm toward said groove thereby changing an active diaphragm area.

3. The system as claimed in claim 1, wherein said feedback means responsive to temperature changes in said combustion chamber includes a thermocouple made of a metallic coating on said optical fiber and an additional wire connected to said metallic coating in close proximity to said diaphragm.

* * * * *